No. 628,491. Patented July 11, 1899.
G. W. RICE.
COTTON OR BEET CHOPPER.
(Application filed Dec. 19, 1898.)
(No Model.) 2 Sheets—Sheet 1.

Witnesses
Gordon W. Rice, Inventor
By his Attorneys.

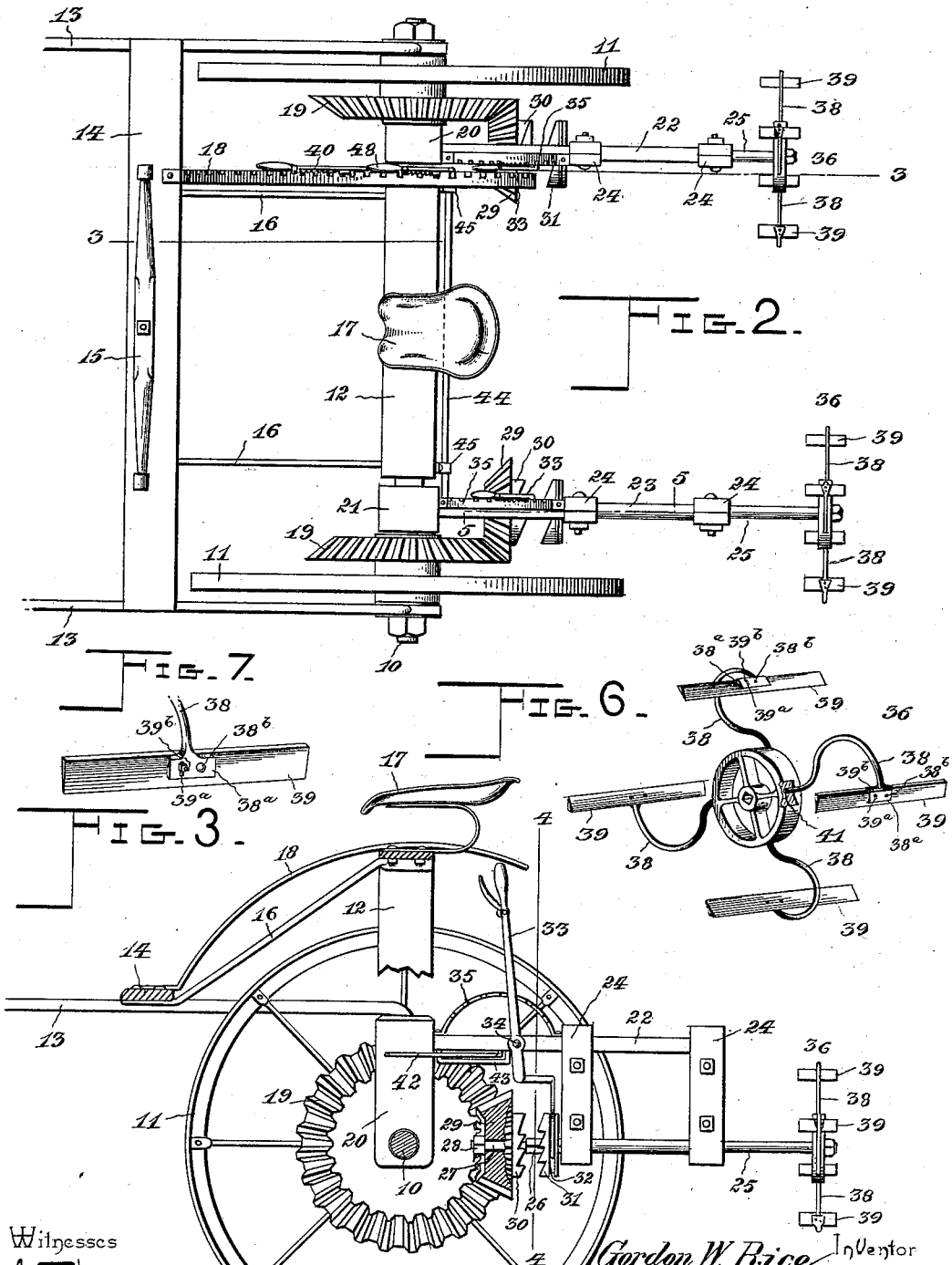

UNITED STATES PATENT OFFICE.

GORDON WARREN RICE, OF DAVENPORT, NEBRASKA.

COTTON OR BEET CHOPPER.

SPECIFICATION forming part of Letters Patent No. 628,491, dated July 11, 1899.

Application filed December 19, 1898. Serial No. 699,726. (No model.)

*To all whom it may concern:*

Be it known that I, GORDON WARREN RICE, a citizen of the United States, residing at Davenport, in the county of Thayer and State of Nebraska, have invented a new and useful Cotton or Beet Chopper, of which the following is a specification.

My invention relates to improvements in choppers adapted for use in thinning a cotton-field or for "bunching" growing plants in a beet-field; and the object in view is to provide a machine of simple and inexpensive construction which may be easily adjusted to sustain revoluble cutters at different elevations.

A further object of the invention is to provide an adjusting means for the independent cutter mechanisms which may be operated to raise or lower one cutter-head independently of the other cutter-head.

A further object of the invention is to provide means for throwing either cutter-head into or out of operation without disturbing the adjustment of the beam or arm on which the cutter-head and its shaft are supported.

With these ends in view the invention consists in the novel combination of elements and in the construction and arrangement of parts, which will be hereinafter fully described and claimed.

To enable others to understand the invention, I have illustrated the preferred embodiment thereof in the accompanying drawings, forming a part of this specification, and in which—

Figure 1:
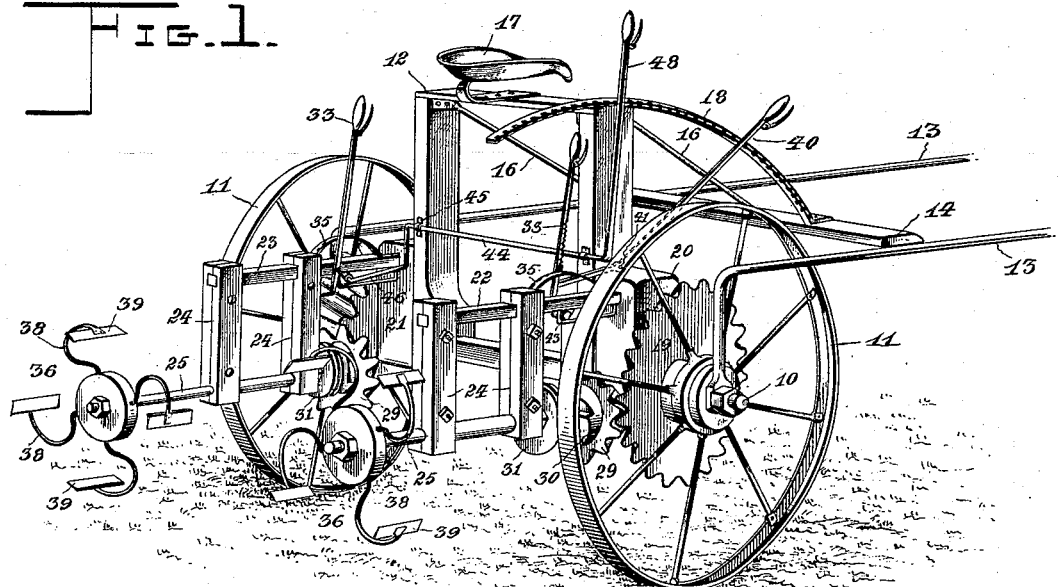
Figure 5:
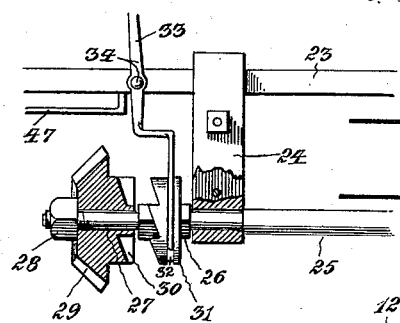
Figure 4:
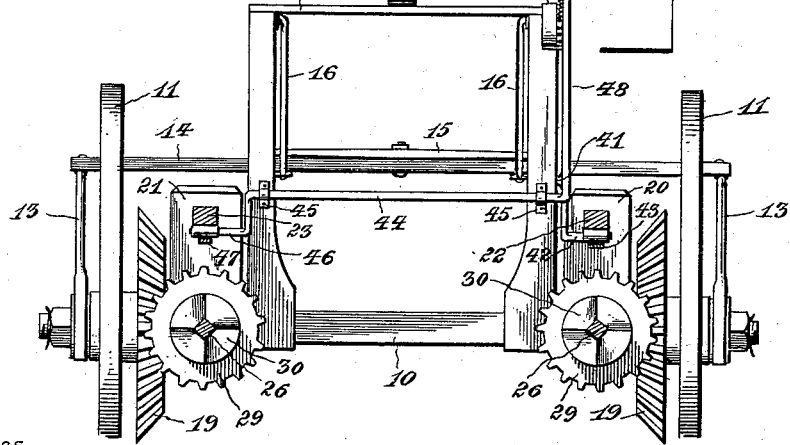

Figure 1 is a perspective view of a chopper constructed in accordance with my invention. Fig. 2 is a plan view thereof. Fig. 3 is a vertical sectional elevation taken longitudinally through the machine on the plane indicated by the dotted line 3 3 of Fig. 2. Fig. 4 is a vertical transverse section on the line 4 4 of Fig. 4. Fig. 5 is an enlarged detail section through the clutch mechanism and of parts with which the clutch coacts, the plane of the section being indicated by the dotted line 5 5. Fig. 6 is a detail view of a rotary cutter having its knives constructed for operating on beet-plants for the purpose of bunching the latter.
Fig. 7 is a detail view of one of the blades and arms.

Like numerals of reference denote like and corresponding parts in each of the several figures of the drawings.

The carrying-axle 10 is equipped with ground-wheels 11, of any preferred construction. Within the ground-wheels is disposed a yoke-shaped frame 12, the ends of which are firmly secured in any approved way to the axle at points a suitable distance from the faces of the beveled gear-wheels, presently described, to accommodate the pivotal blocks or short standards which carry the rotary cutter-heads. The thills 13 are attached to the ends of the axle 10, preferably outside of the hubs of the ground-wheels 11, and said ends of the thills are spaced in relation to the wheel-hubs by interposed washers. Suitable nuts are screwed on the ends of the axle to prevent the thills from being disconnected and the ground-wheels from working off the axle. The thills are joined together by a cross-bar 14, on which is pivoted the whiffletree 15, and the yoke-shaped frame 12 is fastened to the cross-bar 14 by intermediate braces or stays 16. The vertical yoke or frame 12 sustains the driver's seat 17, and between this frame or yoke and the cross-bar 14 is arranged the notched bar 18, which is fastened securely to said yoke in the cross-bar.

19 indicates bevel-gears which are fast with the hubs of the ground-wheels 11. These gears may be made as an integral part of the hubs or the gears may be made separate from the hubs and be secured firmly to said hubs or the spokes of the wheels 11 by any approved means. Between said gears and the yoke or frame 12 are interposed or arranged the pivotal blocks or short standards 20 21, and each block or standard is fitted loosely on the axle 10 for the purpose of rocking or turning thereon in order to elevate or lower the cutter-head out of or into operative relation to the row of plants. The pivotal blocks or short standards carry the outwardly-extending arms or beams 23, each of which lies substantially at a right angle to the standard or block and is made fast therewith in any suitable way. Each arm or beam is movable with the pivotal block or short standard when the latter is adjusted around the axle, and said arm or beam carries a pair of hangers 24, which are attached firmly to the arm and are provided at their lower ends with alined journal-bearings. A cutter-shaft 25 is journaled in the bearings on each arm or beam, so as to lie parallel with the latter, and said cutter-shaft is provided near its inner end with an angular or polygonal section 26 and with a short cylindrical length 27. A driven bevel-gear 29 is fitted loosely on the cylindrical length 27 at the inner extremity of the cutter-shaft, and this bevel-gear is confined between the shoulder which is formed at the juncture of the sections 26 27 of the shaft and a nut 28, which is screwed on a threaded extension of said shaft 25. The driven pinion is free to rotate on the cylindrical length of the cutter-shaft, and said pinion is confined on the shaft against endwise movement, so that its teeth will normally be in mesh with the teeth of the driving bevel-gear 19, the latter rotating with the ground-wheel. The driven bevel-gear 29 on each cutter-shaft is provided on its rear side or face with a clutch-face 30, which is presented opposite to a slidable clutch 31. Said clutch has an angular or polygonal opening corresponding to the length 26 of the cutter-shaft, and said clutch is fitted on this angular length of the cutter-shaft to slide or travel thereon toward or from the clutch-face of the driven gear and also to turn or rotate with the shaft when it is engaged with said beveled gear. To facilitate the adjustment of the slidable clutch, it is formed with a circumferential groove 32, within which is loosely fitted the forked end of an adjusting-lever 33, the latter being fulcrumed at 34 to an arm or beam 22 or 23. The lever is thus carried by one of the adjustable arms or beams in a position for its forked end to remain in engagement with the grooved clutch, which is carried by one of the cutter-shafts journaled on the arm or beam to which the lever is fulcrumed, and the arm or beam may be adjusted through the pivotal block or standard on the axle without disconnecting the lever from the clutch. The end of the lever may engage with a notch which is provided in a holding-segment 35, firmly secured to the adjustable arm or beam, and the lever may be held in position for the clutch to engage with the driven gear or to be free from the latter. The lever does not interfere in any way with the rotation of the clutch, because the forked end of the lever works freely in the groove or clutch.

The bevel-gear 29 on the cutter-shaft is adapted to remain in mesh with the driving bevel-gear 19 at all points of the adjustment of the arm or beam on which the cutter-shaft is mounted, and this end is attained by making the block or standard loose on the axle, so that its center of motion is the same as the axis of the driving-gear 19. When the clutch is disengaged from the clutch-face of the driven gear 29, the latter turns idly and freely on the cutter-shaft, while the clutch remains at rest; but when the lever 33 is operated to throw the clutch into engagement with the gear 29 the clutch is rotated and serves to propel the cutter-shaft, which in turn drives the cutter-head. The rear end of the cutter-shaft is extended or prolonged beyond the rear hanger and the beam or arms, and on said extended end of the cutter-shaft is firmly secured a revoluble cutter 36. The cutter-head may be in the form of a disk or angular plate, and said head has a series of radial sockets 37, in which are firmly secured the inner ends of the arms that carry the knives or blades. Each arm 38 is preferably curved or arched, and it extends a suitable distance beyond the cutter-head. The series of curved arms carry a series of blades or knives 39, each of which is secured firmly to one of the arms, or, if desired, the knife and its arm may be made from a single piece of metal. As shown by Figs. 1 to 3, inclusive, of the drawings, the cutter-head has a series of knives 39, each of which is arranged at an angle to the length of one arm 38, and each knife is of a length suitable for the work it is designed to perform. In using the machine for thinning out cotton-plants in a row of growing plants I contemplate the employment of blades which may be from twelve to fourteen inches in length, and by driving the cutter-shaft at the proper speed a head having knives of this proportion will be found to operate very efficiently in thinning out a row of cotton-plants. To adapt the machine for service in bunching beet-sugar plants in a row, I contemplate driving the cutter shafts and heads at the same speed; but the knives or blades should be from four to six inches in length, so that while the knives operate with the same frequency on the plants they do not remove as many plants at each cutting operation as is the case when chopping cotton-stalks.

The arms or beams 22 23, which carry the independently-revoluble cutter devices that are driven individually by the ground-wheels, are adapted for adjustment separately in order to enable the cutter-head to be adjusted at the proper height to the plants in adjacent rows, and these independently-adjustable arms or beams are controlled by devices within reach of the driver occupying the seat 17, so that either beam and the cutter device may be adjusted without interference by the adjusting device for the other beam and cutter thereon. The arm or beam 22 is adjusted by means of a lever 40, which is fulcrumed at 41 to the yoke or frame 12, and this lever has an arm 42, which is loosely fitted beneath the beam 22 and is confined slidably thereon by a keeper 43, secured firmly to the beam 22. For adjusting the beam 23 I provide a rock-shaft 44, which is arranged transversely on the yoke or frame 12 and is journaled in proper bearings 45, suitably attached to said yoke or frame. The rock-shaft is provided at one end with an arm 46, that is fitted slidably to the beam 23 and confined in disengagement therefrom by the keeper 47, secured firmly to the beam 23. This rock-shaft has a lever 48, which is adapted for engagement with the notched bar 18. It will be observed that the levers 40 and 48 are both arranged at one side of the yoke or frame 12 within convenient reach of the driver and that they are adapted for engagement with the notched bar 18. To enable the levers to be operated independently, I employ a long notched bar 18, arrange the lever 40 to engage with the lower part of said bar, and dispose the lever 48 in a position to engage with the upper part of the bar. The levers 33, 40, and 48 may be made of bars which are somewhat elastic to enable them to be sprung into and out of engagement with the notched bars 35 and 18; but it is obvious that ordinary thumb-latches may be mounted on the levers for actuation by hand and adapted for engagement with the notched bars or segments.

It is thought that the operation and the advantages of my improvements will be readily understood from the foregoing description, taken in connection with the drawings.

Changes may be made in the form and proportion of some of the parts while their essential features are retained and the spirit of the invention embodied. Hence I do not desire to be limited to the precise form of all the parts as shown, reserving the right to vary therefrom.

The revoluble cutter-head 38 may be of disk form, as shown by Fig. 1; but I prefer to skeletonize the head, as represented by Fig. 6—that is to say, the head consists of a hub, a rim, and radial spokes. The rim has a series of sockets—four, five, or six in number—to provide for the attachment of the desired number of blades. The blades or knives are each arranged at such an angle to the length of the arm as to produce the best cutting effect, and I contemplate an adjustable connection between the end of the arm and the blade. This is effected by providing each arm with an enlarged end 38$^a$, and each knife has a pivotal connection 38$^b$ with the end 38$^a$, said knife also having a slot 39$^a$ to receive the bolt or screw 39$^b$.

In using the machine in a cotton-field the knife-arms should be so fashioned as to bring the knives in a horizontal position to cut squarely across the row of cotton-plants when the head is lowered into operative position, and thus prevent the knives at their rear ends striking the ground. Of course the machine when used as a cotton-chopper should be made large enough for the cutter-heads to operate on the two rows of cotton-plants when the machine is drawn between the two rows.

What I claim is—

1. In a chopper substantially such as described, the combination with an axle and a ground-wheel, of a beam or arm pivotally mounted on the axle, a cutter-shaft geared to the ground-wheel and carrying a cutter-head, a lever connected with the beam for adjusting the latter in a vertical plane, and another lever mounted on the adjustable beam and operable independently of the first-named lever for controlling the gearing between the cutter-shaft and the ground-wheel, substantially as described.

2. In a chopper substantially such as described, the combination with an axle and a ground-wheel having a bevel-gear, of a beam mounted on the axle, a lever connected to the frame and to the beam for adjusting the latter vertically, a cutter-shaft journaled on the beam and having a revoluble cutter, a driven pinion loosely fitted to the cutter-shaft and engaging with the gear on the ground-wheel, a clutch fitted slidably on the cutter-shaft for engagement with the bevel-gear, and a lever fulcrumed on the beam for adjustment vertically therewith, and engaging with the slidable clutch, substantially as described.

3. In a chopper substantially such as described, the combination with an axle and ground-wheels each provided with a bevel-gear, of the independent beams pivotally mounted on the axle, cutter-shafts journaled on said beams and geared to the bevel-gears of the ground-wheels, cutter-heads on said shaft, and independent adjusting-levers connected individually with the beams for vertically adjusting the latter and the cutter devices thereon, substantially as set forth.

4. In a chopper substantially as described, the combination with an axle, ground-wheels thereon provided with driving-gears, and a yoke or frame, of adjustable beams pivotally mounted on the axle between the yoke or frame and the ground-wheels, cutter-shafts journaled on the beams and geared to the ground-wheels, cutter-heads on said shafts, a lever fulcrumed on the yoke or frame and engaging slidably with one beam, a rock-shaft journaled transversely on the yoke or frame and having an arm engaged slidably with the other beam, a lever attached to the rock-shaft, and a suitable holding device for said levers, substantially as described.

In testimony that I claim the foregoing as my own I have hereto affixed my signature in the presence of two witnesses.

GORDON WARREN RICE.

Witnesses:
A. J. CROFT,
HENRY RITZEN.